United States Patent Office 3,087,918
Patented Apr. 30, 1963

3,087,918
MODIFIED ACROLEIN-PENTAERYTHRITOL RESINS
Howard R. Guest, Charleston, Ben W. Kiff, Ona, and Calvert B. Halstead, St. Albans, W. Va., assignors to Union Carbide Corporation, a corporation of New York
No Drawing. Filed Aug. 1, 1957, Ser. No. 675,563
8 Claims. (Cl. 260—88.3)

The subject of this invention is a novel process for preparing condensation products of certain unsaturated spirane-like acetals with polyhydroxy alcohols and a new group of resins formed by the condensation of the unsaturated spirane-like acetals with pentaerythritol. More specifically this invention relates to the formation of resins from polhydroxy alcohols and an unsaturated spirobi (m-dioxane) having the following general formula:

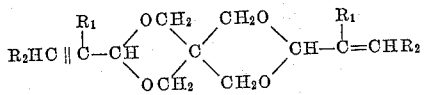

wherein $R_1$ is hydrogen, methyl or chlorine and $R_2$ is hydrogen or methyl in the presence of a sulfate ester of an alcohol as a catalyst.

The formation of polymers by the condensation of acrolein or substituted acrolein and pentaerythritol with the subsequent condensation of the reaction product with a polyhydroxy alcohol may be practiced by two different methods. The practice of one method involves the formation of a liquid pre-condensate by reacting the acrolein and pentaerythritol in reciprocal proportion to their functionality. Thus, pentaerythritol has a functionality of four as a polyhydric alcohol, and acrolein has a functionality of three, considering the reactivity of both the carbonyl group and the olefinic group. The pre-condensate is formed by reacting about three moles of pentaerythritol and about four moles of acrolein in the presence of an acid catalyst. After the water of reaction is removed the pre-condensate is a viscous liquid or A-stage resin which slowly condenses to a solid plastic. Polyhydric alcohols may be added to the A-stage resin to modify its properties. For practical applications, the condensation can be stopped by the neutralization or removal of the catalyst. The neutral liquid pre-condensate can be stored until needed and can then be hardened into a plastic by the addition of an acid.

In the practice of the second method the reaction is carried out by first forming and isolating the unsaturated spirobi (m-dioxane) resulting from the reaction of acrolein or substituted acrolein and pentaerythritol. The preferred acetal of this invention is:

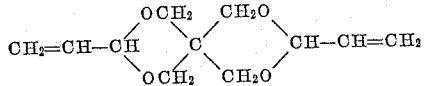

3,9-divinylspirobi (m-dioxane) (diallylidene-pentaerythritol)

Other unsaturated acetals which may be used include:

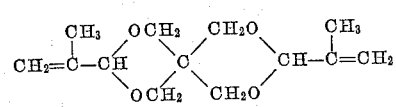

3,9-diisopropenylspirobi (m-dioxane)

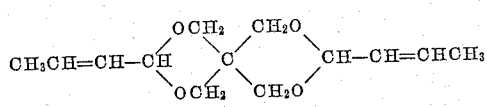

3,9-dipropenylspirobi (m-dioxane)

and

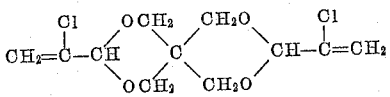

3,9-bis (1-chlorovinyl) spirobi (m-dioxane)

These unsaturated acetals may then be reacted with polyhydric alcohols in the presence of an acidic catalyst to yield a polymer. A great advantage to making resins in this manner is that no volatile material is present, such as water, which must be eliminated by distillation. Because of the bifunctionality of the unsaturated acetals they can react with compounds having two or more hydroxyl groups to form marcromolecules. Polymers formed in this manner have the advantage of the toughness and high impact strength possessed by curing the A-stage material but at the same time can be formulated for specific uses with greater ease.

Polyhydroxy alcohols have been reacted with 3,9-divinylspirobi (m-dioxane) for the production of casting resins. These reactions have been catalyzed with strongly acidic catalysts at temperatures of 50° C. to 80° C. Approximately the same temperatures were used for the curing operation. However, until applicants' present invention it had not been possible to utilize appreciable quantities of pentaerythritol as the polyhydroxy alcohol in the reaction with 3,9-divinylspirobi (m-dioxane) and the other unsaturated spirobi (m-dioxanes).

The ready availability, low cost, and high ratio of hydroxy groups to molecular weight make pentaerythritol one of the most valuable of all polyhydroxy compounds available. In addition, since it is used to make the unsaturated acetal it would of course be advantageous to continue its use throughout the whole preparation. Furthermore its unique structure allows it to cross-link the unsaturated acetals in a way that would confer the properties associated with a highly symmetrical molecule upon the polymer.

The inability of other workers in this field to bring about the above reaction is associated with the low temperatures (50 to 80° C.) at which the condensation was conducted. It was necessary to use these temperatures because the acidic catalysts, which were used prior to applicants' invention, would char the unsaturated spirobi (m-dioxane) at the relatively high temperatures required for reaction with the pentaerythritol. Among the catalysts used in the past have been hydrochloric acid, acetic acid, various sulfonic acids, stannic chloride and boron trifluoride.

All of these catalysts, and any others which have been used heretofore also suffer from the serious disadvantage that they do not cure the resin in the presence of iron or steel. This is particularly serious because many of the molds for curing the resin would normally be made of steel. In certain applications, such as making forms for stamping metal parts, it is desirable to harden the resin by mixing it before curing with appreciable quantities of iron powder. In some cases the iron may amount to 20–50% by weight of the final mixture. The fact that the iron powder cannot be used as filler with the conventional catalysts limits the usefulness of the resin.

We have now found a means of achieving reaction between the unsaturated spirobi (m-dioxanes) and pentaerythritol with the formation of polymers with excellent properties. We have also found a means whereby other polyhydroxy alcohols may be reacted with the unsaturated acetals to form resins which do not have the disadvantages of process and composition limitations made necessary by the prior art catalysts.

Applicants' invention is made possible by the discovery that the sulfate esters of alcohols such as dialkyl sulfates, and particularly diethyl sulfate, are effective catalysts for the reaction. The use of diethyl sulfate allows mixtures containing unsaturated spirobi (m-dioxane) to be heated to relatively high temperatures without charring.

In the presence of alcohols, the diethyl sulfate reacts to give ethylsulfuric acid:

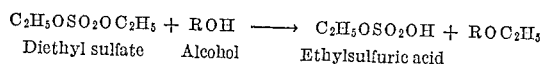
Diethyl sulfate    Alcohol    Ethylsulfuric acid

This reaction begins at a relatively slow rate below 90° C. and accelerates as the temperature is raised. Above 170° C. the material decomposes to ethylene and sulfuric acid.

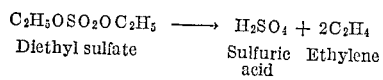
Diethyl sulfate    Sulfuric    Ethylene
                   acid

Because of the fact that the acid is generated in situ at a controlled rate, the reaction can be conducted at 90° C. or higher. At such temperatures, the polyhydroxy alcohols will react with the unsaturated acetal completely to form intermediate condensation products which are converted to hard, tough polymers by further heating. The reaction temperatures for pentaerythritol are 110° C. or higher with the preferred temperature being between 120° to 150° C.

The unsaturated acetals and polyhydroxy resins may be cured in a much shorter time by using these sulfate esters of an alcohol, such as diethyl sulfate or pentaerythritol tetrasulfate, rather than the conventional catalysts. No caution need be exercised in the rate at which the temperature is raised during the condensation and curing stages. This allows the resin to be heated at a rapid rate and since acid is generated in situ in an intimate admixture with the resin and cure may be effected very quickly.

Other dialkyl sulfates such as dimethyl, diisopropyl, di-secondary butyl, octyl, dodecyl and octadecyl may also be used. While higher dialkyl sulfates can be used, they are less efficient because of the dilution effect of the long alkyl groups in generating a given amount of acid. In general, therefore, the alkyl groups may contain up to 18 carbon atoms, with those dialkyl sulfates containing up 8 carbon atoms in the alkyl group being preferred.

The procedure to prepare these resins involves mixing a polyhydric alcohol, an unsaturated spirobi (m-dioxane) and the dialkyl sulfate catalyst and heating the mixture while stirring to the reaction temperature. After a clear solution is formed, the product is ready for curing in the final form. The liquid condensation material can be used to produce molded articles, laminates, or any product for which other thermosetting resins are used.

The methods of this invention may be practiced by using a wide range in the relative concentrations of the reactants. For instance, pentaerythritol has four hydroxyl groups and the 3,9-divinylspirobi (m-dioxane) has two double bonds, the theoretical combining ratio should be two moles of the latter to one mole of the former. However, we have been able to make resins with desirable properties over the range of one mole of each to three moles of 3,9-divinylspirobi (m-dioxane) to one mole of pentaerythritol.

The quantity of the catalyst used may be varied over a wide range. For instance, as little as 0.05% of diethylsulfate based on the total weight of reactants will catalyze the reaction and as much as 2% has been used in some experiments. While more than this can be used, no particular advantage should follow from it. Most satisfactory polymers have been obtained with 0.25% to 1.0% of the diethyl sulfate.

The initial reaction for the pentaerythritol modified resin can take place at 110° C. to 160° C. although the temperatures of 120° C. to 150° C. are preferred. The curing operation can take place at 70 C. to 160° C. The initial reaction for other polyhydric alcohols can take place at much lower temperatures such as 90° C. Some of the other polyhydroxy compounds which may be used are trimethylol propane, trimethylol ethane, sorbitol, glycerine, mannitol, dulcitol and 2,4-dihydroxy-3,1-hydroxy methyl pentane. At the lower temperatures the polymerization may require as long as 24 hours while at the higher temperatures as short a time as 10 minutes is sufficient.

The catalysts and methods of this invention may also be used when the unsaturated acetal is in the liquid "A" stage resin. It should be noted, however, that the dialkyl sulfates must be added to the liquid "A" stage resin after the removal or neutralization of the original catalyst. Furthermore, if the dialkyl sulfate is used as the original catalyst it will be hydrolyzed and formed into sulfuric acid upon the condensation of the acrolein compound and pentaerythritol.

*Example I*

A charge of 318 g. of 3,9-divinylspirobi (m-dioxane) (1.5 moles), 68 g. of pentaerythritol (0.5 mole) and 3.01 g. of diethyl sulfate (0.77%) was placed in a reaction flask. The mole ratio of unsaturated acetal to pentearythritol was 3 to 1. The mixture was heated to 110° C. and the temperature slowly raised over a period of 40 minutes to a maximum of 140° C. At the conclusion of the reaction the material was poured into molds and cured by further heating. One sample, cured 90 minutes at 125° C., had these properties:

Heat distortion_____° C__ 55
Flexural modulus_____p.s.i__ 425,000
Hardness, "durometer D"_____ 85
Impact (Izod), ft.-lbs. per in. of notch_____ 0.5

*Example II*

3,9-divinylspirobi (m-dioxane) and pentaerythritol were reacted in the proportion of 2 moles to 1 as follows:

A charge of 212 g. of 3,9-divinylspirobi (m-dioxane) (1.0 mole), 68 g. pentaerythritol (0.5 mole) and 2.11 g. diethyl sulfate (0.75%) was placed in a reaction flask. Th mixture was heated to 100° C. and slowly raised to a final temperature of 127° C. over a period of 30 minutes. The liquid product was then poured into molds and cured by further heating. One sample, cured 8 hours at 125° C., had the following properties:

Heat distortion_____° C__ 92
Flexural modulus_____p.s.i__ 395,000
Hardness, "durometer D"_____ 87
Impact (Izod), ft.-lbs. per in. of notch_____ 0.6

*Example III*

A resin made in the ratio of 1.5 moles of 3,9-divinylspirobi (m-dioxane) to 1 mole pentaerythritol was made as follows:

Pentaerythritol (54 g.-0.397 mole) and 3,9-divinylspirobi (m-dioxane) (126 g.-0.595 mole) were mixed and 0.827 g. of diethyl sulfate (0.45%) was added. This mixture was heated for 80 minutes at 122° to 128° C. The liquid product was then poured into molds and heated for further polymerization. One sample cured for four hours at 125° C. had these properties:

Heat distortion_____° C__ 103
Flexural modulus_____p.s.i__ 395,000
Hardness, "durometer D"_____ 85
Impact (Izod), ft.-lbs. per in. of notch_____ 0.3

*Example IV*

A resin with equal molar quanties of reactants was made as follows:

A charge of 84 g. of 3,9-divinylspirobi (m-dioxane) (0.40 mole), 54 g. pentaerythritol (0.40 mole) and 0.69 g. diethyl sulfate (0.50%) was heated for 10 minues at 110-119° C. The liquid product was poured into molds and cured. One sample, heated for three hours at 125° C., had these properties:

| | | |
|---|---|---|
| Heat distortion | °C | 92 |
| Flexural modulus | p.s.i | 396,000 |
| Hardness, "durometer D" | | 84 |
| Impact (Izod), ft.-lbs. per in. of notch | | 0.4 |

*Example V*

A charge of 106 g. of 3,9-divinylspirobi (m-dioxane) (0.5 mole), 45 g. trimethylol propane (0.34 mole) and 1.30 g. diethyl sulfate (0.86%) was heated at 96% to 114° C. for 17 minutes. The liquid product was poured into molds and polymerized by further heating. One sample cured 21 hours at 100° C. had these properties:

| | | |
|---|---|---|
| Heat distortion | °C | 68 |
| Flexural modulus | p.s.i | 386,000 |
| Hardnes, "durometer D" | | 82 |
| Impact (Izod), ft.-lbs. per in. of notch | | 0.3 |

*Example VI*

A charge of 106 g. (0.5 mole) of 3,9-divinylspirobi (m-dioxane) 40 g. (0.33 mole) of trimethylol ethane and 1.17 g. diethyl sulfate was heated for 15 minutes at 98° to 117° C. The liquid was poured into molds and polymerized by further heating. A sample cured 22 hours at 100° C. had these properties:

| | | |
|---|---|---|
| Heat distortion | °C | 73 |
| Flexural modulus | p.s.i | 325,000 |
| Hardness, "durometer D" | | 78 |
| Impact (Izod), ft.-lbs. per in. of notch | | 0.9 |

*Example VII*

A charge of 106 g. (0.5 mole) of 3,9-divinylspirobi (m-dioxane), 30 g. (0.157 mole) of sorbitol and 1.21 g. of diethyl sulfate was heated for 20 minutes at 98° C. The liquid product was poured into molds and polymerized by further heating. A sample cured for 17 hours at 100° C. had these properties:

| | | |
|---|---|---|
| Heat distortion | °C | 115 |
| Flexural modulus | p.s.i | 407,000 |
| Hardness, "durometer D" | | 85 |
| Impact (Izod), ft.-lbs. per in. of notch | | 0.2 |

*Example VIII*

A charge of 106 g. (0.5 mole) of 3,9-divinylspirobi (m-dioxane) and 30 g. (0.165 mole) of mannitol was heated with 1.18 g. of diethyl sulfate catalyst for 42 minutes at 92° C. to 115° C. The liquid product was then poured into molds and polymerized by further heating. A sample cured 16 hours at 100° C. had these properties:

| | | |
|---|---|---|
| Heat distortion | °C | 93 |
| Flexural modulus | p.s.i | 354,000 |
| Hardness, "durometer D" | | 85 |
| Impact (Izod), ft.-lbs. per in. of notch | | 0.1 |

*Example IX*

A mixture was made of 106 g. 3,9-divinylspirobi (m-dioxane) (0.5 mole), 45 g. trimethylol propane (0.34 mole) and 1.19 g. diethyl sulfate. To this was added 64 g. of kaolin as a filler. The mixture was heated for 12 minutes at 100° C. to 113° C. The material was poured into molds and polymerized by further heating. A sample cured for 19 hours at 100° C. had these properties:

| | | |
|---|---|---|
| Heat distortion | °C | 68 |
| Flexural modulus | p.s.i | 385,000 |
| Hardness, "durometer D" | | 82 |
| Impact (Izod), ft.-lbs. per in. of notch | | 0.3 |

*Example X*

This example shows the preparation of resin from 3,9-diisopropenylspirobi (meta-dioxane) and pentaerythritol with pentaerythritol tetrasulfate as a curing catalyst.

A charge of 120 g. of 3,9-diisopropenylspirobi (meta-dioxane), 34 g. of pentaerythritol, and 0.5 g. pentaerythritol tetrasulfate was placed in a reaction flask. The pentaerythritol tetrasulfate was prepared according to a procedure outlined in J. Gen. Chem. USSR 16, 677–88 (1946) by the reaction of pentaerythritol with chlorosulfonic acid. The mixture was heated at 140–145° C. for one hour. It was then poured into molds and cured for 16 hours at 150° C. The resulting product was a light brown, hard, solid polymer.

*Example XI*

This example shows the preparation of resin from 3,9-di-(1-chlorovinyl) spirobi (meta-dioxane) and pentaerythritol.

A charge of 96 g. of 3,9-di(1-chlorovinyl) spirobi (meta-dioxane), 23 g. pentaerythritol, and 0.368 g. diethyl sulfate was placed in a reaction flask and heated for 85 minutes at 138°–141° C. At the end of that time an additional 0.76 g. of diethyl sulfate was added and the mixture was poured into molds and cured for 16 hours at 100° C. The resulting polymer was a hard, dark solid.

*Example XII*

This example shows the preparation of a resin from 3,9-divinylspirobi (meta-dioxane) and pentaerythritol using dioctyl sulfate as a curing catalyst.

Dioctyl sulfate was prepared from octyl alcohol by the method given in the Journal of the American Chemical Society 56, 1204 (1934). In this preparation the alcohol was first reacted with sulfuryl chloride to make the chlorosulfate and in another reaction the alcohol was reacted with thionyl chloride to give octyl sulfite. Reaction of these two products produced dioctyl sulfate. After distillation this product was used as catalyst to prepare a resin.

A charge of 95 g. of 3,9-divinylspirobi (meta-dioxane), 30 g. of pentaerythritol, and 2.5 g. of dioctyl sulfate was placed in a reaction flask and heated at 140° C. for 20 minutes. The material was poured into forms and cured for 16 hours at 100° C. The resulting polymer was a hard, glossy solid with excellent hardness and good impact strength. It had a particularly good color.

What is claimed is:

1. A process for the production of a synthetic resin which comprises bringing into admixture in an anhydrous environment (a) pentaerythritol, (b) an unsaturated acetal having the general formula:

$$R_2HC=C(R_1)-CH\begin{matrix}OCH_2\\OCH_2\end{matrix}C\begin{matrix}CH_2O\\CH_2O\end{matrix}CH-C(R_1)=CHR_2$$

wherein $R_1$ designates a member selected from the group consisting of hydrogen, chlorine and the methyl radical and $R_2$ designates a member selected from the group consisiting of hydrogen and the methyl radical, and (c) from about 0.05 percent to about 2 percent by weight of an organic sulfate selected from the group consisting of the dialkyl sulfates and pentaerythritol tetrasulfate; and heating the resultant mixture at a temperature of from 110° C. to 160° C. for a period of time sufficient to produce a resin.

2. The process according to claim 1 wherein the organic sulfate is dimethyl sulfate.

3. The process according to claim 1 wherein the organic sulfate is diethyl sulfate.

4. The process according to claim 1 wherein the organic sulfate is diisopropyl sulfate.

5. The process according to claim 1 wherein the organic sulfate is dioctyl sulfate.

6. A process for the production of a synthetic resin which comprises bringing into admixture in an anhydrous environment (a) pentaerythritol, (b) from 1 to about 3 moles of 3,9-divinyl spirobi(m-dioxane) per mole of said pentaerythritol, and (c) from about 0.05 percent to about 2 percent by weight based upon the weight of (a) plus (b) of an organic sulfate selected from the group consiting of the dialkyl sulfates and pentaerythritol tetrasulfate; and heating the resultant mixture at a temperature of from 110° C. to 160° C. for a period of time sufficient to produce a resin.

7. A solid polymer of pentaerythritol and an unsaturated acetal having the general formula:

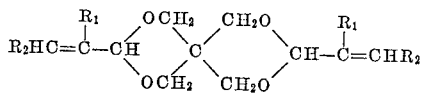

wherein $R_1$ designates a member selected from the group consisting of hydrogen, chlorine and the methyl radical and $R_2$ designates a member selected from the group consisting of hydrogen and the methyl radical, said solid polymer containing in chemically combined form from about 1 to about 3 moles of said unsaturated acetal per mole of said pentaerythritol.

8. The solid polymer according to claim 7 wherein the unsaturated acetal is 3,9-divinylspirobi(m-dioxane).

References Cited in the file of this patent

UNITED STATES PATENTS

| | | |
|---|---|---|
| 2,292,611 | Caplan | Aug. 11, 1942 |
| 2,401,776 | Rothrock | June 11, 1946 |
| 2,687,407 | Orth | Aug. 24, 1954 |
| 2,913,434 | Guest et al. | Nov. 17, 1959 |

FOREIGN PATENTS

| | | |
|---|---|---|
| 1,108,885 | France | Sept. 14, 1955 |
| 838,827 | Germany | May 12, 1952 |

OTHER REFERENCES

Schulz et al.: Angewandte Chemie, vol. 62, No. 5, March 1950, pages 1–5, 113–118.